United States Patent [19]

Fuchigami et al.

[11] Patent Number: 5,321,058
[45] Date of Patent: Jun. 14, 1994

[54] CURABLE ORGANOSILOXANE COMPOSITIONS EXHIBITING REDUCED MOLD STAINING AND SCORCHING

[75] Inventors: Hiroshi Fuchigami; Hiroshi Honma; Takao Matsushita, all of Chiba, Japan

[73] Assignee: Dow Corning Toray Silicone Co., Ltd., Tokyo, Japan

[21] Appl. No.: 978,214

[22] Filed: Nov. 16, 1992

Related U.S. Application Data

[63] Continuation-in-part of Ser. No. 703,950, May 22, 1991, abandoned.

[30] Foreign Application Priority Data

May 31, 1991 [JP] Japan .................. 142808

[51] Int. Cl.$^5$ .................................. C08K 9/10
[52] U.S. Cl. .................... 523/211; 524/493; 524/588
[58] Field of Search .............. 523/211; 524/588, 493

[56] References Cited

U.S. PATENT DOCUMENTS

| | | | |
|---|---|---|---|
| 3,992,355 | 11/1976 | Itoh et al. | 528/15 |
| 4,020,014 | 4/1977 | Service et al. | 528/15 |
| 4,329,275 | 5/1982 | Hatanaka et al. | 528/15 |
| 4,481,341 | 11/1984 | Schiak et al. | 525/478 |
| 4,528,354 | 7/1983 | McDougal | 528/33 |
| 4,929,669 | 5/1990 | Jensen | 524/861 |
| 5,006,372 | 4/1991 | Wolfer et al. | 528/15 |
| 5,017,654 | 5/1991 | Togashi et al. | 525/100 |

FOREIGN PATENT DOCUMENTS

| | | |
|---|---|---|
| 355459 | 2/1990 | European Pat. Off. |
| 49-009620 | 3/1974 | Japan . |
| 56-020050 | 2/1981 | Japan . |
| 01055239 | 3/1989 | Japan . |
| 01113463 | 5/1989 | Japan . |
| 01249858 | 10/1989 | Japan . |
| 2049717 | 10/1980 | United Kingdom . |

Primary Examiner—Melvyn I. Marquis
Assistant Examiner—Karen A. Dean
Attorney, Agent, or Firm—Robert Spector

[57] ABSTRACT

The combination of an organic peroxide, a platinum-containing hydrosilation catalyst that is encapsulated within microparticles of a thermoplastic silicone resin, and acetylenic alcohol as the platinum catalyst inhibitor imparts a unique and desirable combination of properties to organosiloxane compositions curable by a platinum-catalyzed hydrosilylation reaction when the compositions contain a gum-type organopolysiloxane as the major ingredient. The compositions have long term storage stability and cure completely when molded. Cured articles molded from the compositions exhibit excellent mold release properties together with the absence of scorching, mold staining and surface tackiness.

4 Claims, No Drawings

CURABLE ORGANOSILOXANE COMPOSITIONS EXHIBITING REDUCED MOLD STAINING AND SCORCHING

REFERENCE TO COPENDING APPLICATIONS

This application is a continuation-in-part of U.S. application Ser. No. 703,950, filed on May 22, 1991, now abandoned.

BACKGROUND OF THE INVENTION

1. Field of the Invention

This invention relates to curable organosiloxane compositions. More particularly, this invention relates to organosiloxane compositions containing as the main ingredient a high consistency, gum polyorganosiloxane. The present compositions are particularly suitable for processing by extrusion molding and by pressure-molding techniques such as press molding, transfer molding, and injection molding. The compositions are characterized by an absence of mold staining in combination with a resistance to scorching, good mold release and long term storage stability.

2. Background Information

Organosiloxane compositions characterized by those skilled in the art as millable typically contain as the major organosiloxane ingredient at least one gum organopolysiloxane. The molding methods generally chosen for these millable organosiloxane compositions are extrusion molding and pressure-molding methods such as press molding, transfer molding, and injection molding. The curing agents typically used in these moldable compositions are organic peroxides. The advantages associated with the use of these curing agents are excellent storage stability in the vicinity of room temperature and a relatively long working time at elevated temperatures, which facilitates fabrication of these compositions using conventional molding techniques.

Curable compositions containing organic peroxides have some disadvantages when used in pressure molding applications. These disadvantages include poor mold release properties, resulting in cracking or tearing of the rubber during demolding, and mold staining due to incomplete curing in the regions adjacent to the molding's parting line. Mold staining is believed to result from an inhibition of curing by atmospheric oxygen.

Disadvantages associated with extrusion molding of high-consistency peroxide curable organosiloxane compositions include development of surface tackiness which, like mold staining, is due to an inhibition of curing at the molding's surface by atmospheric oxygen. A dusting agent such as talc is typically used to prevent surface tackiness.

The methods that have been proposed to improve mold release include addition to curable organosiloxane composition of any of a variety of internal release agents such as fatty acid metal salts such as zinc stearate and calcium stearate. This remedy does not provide a basic or fundamental solution to such problems as the poor vulcanization in the vicinity of the molding's parting line and surface tackiness.

Another method that has been used to cure both high consistency and liquid curable organosiloxane compositions is a hydrosilation reaction between an polyorganosiloxane containing at least two vinyl or other ethylenically unsaturated hydrocarbon radicals and an organohydrogensiloxane. This reaction is typically catalyzed by platinum metal and platinum compounds. One of the problems associated with this type of curable composition is the relatively short storage time of compositions containing all of the reactive ingredients, even when known platinum catalyst inhibitors are present in the curable composition.

The use of organic peroxides to accelerate curing of organosiloxane compositions that cure by a platinum-catalyzed hydrosilylation reaction is taught in U.S. Pat. No. 3,922,355, which issued to Itoh et al on Nov. 19, 1976. These compositions also contain hydrazine as a platinum catalyst inhibitor to extend the useful working time of the composition.

U.S. Pat. No. 4,329,275, which issued to Hatanaka et al. on May 11, 1982 teaches the use of small amounts of organic peroxides in combination with specified platinum/phosphorus complexes. The peroxide inhibits curing of the composition at room temperature while increasing the activity of the platinum catalyst at the elevated temperatures used to cure the composition.

The use of vinyl-specific organic peroxides to improve the compression set exhibited by elastomers prepared from liquid organosiloxane compositions that cure by a platinum-catalyzed hydrosilation reaction is taught in U.S. Pat. No. 4,929,669, which issued to Jensen on May 29, 1990.

The present inventors discovered that when concentrations of peroxide larger than those disclosed in the aforementioned patent to Hatanaka et al. are present in the curable composition, a considerable amount of scorching occurs at even relatively low molding temperatures.

The use of encapsulated platinum-containing hydrosilation catalysts in place of conventional catalyst inhibitors to inhibit curing of organosiloxane compositions at temperatures of from 25 to about 40 degrees C. is taught in U.S. Pat. No. 4,481,341, which issued to Schlak et al. on Nov. 6, 1984. The shortcoming of the catalysts disclosed by Schlak is that the presence of even very small amounts of the platinum catalyst on the surface of the particles of encapsulated catalyst is sufficient to adversely affect the long-term storage stability of the composition.

U.S. Pat. No. 5,017,654 which issued on May 21, 1991 to Togashi and Saruyama teaches using actylenic compounds and certain alkenyl-functional organosiloxane compounds as platinum catalyst inhibitors to improve the storage stability of compositions containing encapsulated platinum catalysts.

An objective of this invention is to eliminate the disadvantages associated with using more than about 0.1 weight percent, based on curable organopolysiloxane, of organic peroxides in organosiloxane compositions curable by a platinum-catalyzed hydrosilation reaction when these compositions are used in applications requiring molding.

SUMMARY OF THE INVENTION

As a result of extensive research directed at solving the problems associated with the presence of organic peroxides during platinum-catalyzed hydrosilylation reactions, the present inventors discovered that these problems could be eliminated or substantially reduced by encapsulating the platinum-containing catalyst within a microparticulate form of a thermoplastic resin and using the catalyst in combination with an acetylenic alcohol type of platinum catalyst inhibitor. The present invention was developed based on this discovery.

DETAILED DESCRIPTION OF THE INVENTION

This invention provides a curable organosiloxane composition comprising (A) 100 weight parts of a polyorganosiloxane gum containing at least 2 silicon-bonded alkenyl radicals in each molecule and represented by the average unit formula $$R_aSiO_{(4-a)/2}$$

where R is a monovalent hydrocarbon or halogenated hydrocarbon radical, and the value of a is from 1.8 to 2.3, inclusive, (B) from 10 to 100 weight parts of a reinforcing filler, (C) from 0.1 to 10 weight parts of an organohydrogensiloxane containing at least 2 silicon-bonded hydrogen atoms in each molecule, (D) an amount of a microencapsulated platinum-containing hydrosilation catalyst sufficient to promote curing of said composition, where said catalyst is encapsulated within spherical microparticles of a thermoplastic silicone resin having a softening point of from 50° to 200° C., where said microparticles exhibit a diameter of from 0.01 to 10 microns and contain a concentration of said catalyst equivalent to at least 0.01 weight percent, calculated on the basis of platinum metal, (E) from 0.1 to 10 weight parts of an organic peroxide, and (F) an amount of an acetylenic alcohol sufficient to provide long-term storage stability to the curable composition at temperatures below the softening temperature of the resin used to encapsulate the hydrosilation catalyst.

The improvements that characterizes the present compositions are (1) encapsulation of the hydrosilation catalyst within spherical microparticles of a thermoplastic silicone resin having a softening point of from 50° to 200° C., and (2) the presence of an acetylenic alcohol as a hydrosilation catalyst inhibitor.

The advantages that characterize the present compositions include but are not limited to:

Long-term storage stability prior to curing,
Long working time during the curing process,
Good mold releasability,
Elimination of mold staining caused by the presence of uncured or incompletely cured rubber in the vicinity of the molding's parting line, and
Negligible surface tackiness on the cured molding.

The ingredients of the present compositions will now be explained in detail.

The Polyorganosiloxane Gum (Ingredient A)

The polyorganosiloxane gum referred to as ingredient A is the principal or main ingredient of the present compositions. This gum must contain at least 2 silicon-bonded alkenyl radicals in each molecule and is represented by the average unit formula $$R_aSiO_{(4-a)/2}$$

where the substituent represented by R is selected from monovalent hydrocarbon radicals exemplified by alkyl such as methyl, ethyl, propyl, butyl, hexyl, and octyl; alkenyl such as vinyl, allyl, and hexenyl; aryl such as phenyl; and by halogenated monovalent hydrocarbon radicals such as 3,3,3-trifluoropropyl. The value of a in this formula should be from 1.8 to 2.3, inclusive.

The molecular structure of ingredient A comprises a sequence of siloxane units arranged in either a linear or branched configuration. The degree of polymerization of this ingredient should be sufficient to achieve a product referred to in the organosiloxane art as a "gum". The viscosity of the gum at 25° C. should be at least $10^7$ centistokes and its average molecular weight should be at least $25 \times 10^4$ and preferably at least $40 \times 10^4$.

The Reinforcing Filler (Ingredient B)

The reinforcing filler comprising ingredient B includes all of the known reinforcing fillers for silicone rubbers. Examples of suitable fillers include but are not limited to microparticulate silica and carbon black. Microparticulate silica is exemplified by fumed silica and precipitated silica. Ultramicroparticulate silicas with particle diameters below 50 nanometers and with specific surface areas of at least 100 m²/g are preferred. Most preferably the silica has been surface-treated with an organosilane, organosilazane, or diorganocyclopolysiloxane.

Carbon blacks are used to impart electrical conductivity to the cured silicone rubber. Representative types of carbon black include acetylene blacks, Ketjen(®) blacks, furnace blacks, and thermal blacks.

The Organohydrogensiloxane (Ingredient C)

The organohydrogensiloxane, referred to as ingredient C of the present compositions, in a crosslinker for the polyorganosiloxane (ingredient A). Ingredient C must contain at least 2 silicon-bonded hydrogen atoms in each molecule in order for the present compositions to form a network structure. Other than these silicon-bonded hydrogen atoms, the organic groups bonded to the silicon atoms of ingredient C include the same group of monovalent hydrocarbon and halogenated hydrocarbon radicals represented by R in the foregoing average unit formula of ingredient A. The organic groups may comprise only a single species within the individual molecule or may comprise a mixture of two or more species.

The molecular structure of this organohydrogensiloxane can be straight-chain, network, or three-dimensional. Ingredient C can be a single homopolymer or copolymer, or a mixture of two or more of these types of polymers. The organohydrogensiloxane(s) should typically have a degree of polymerization corresponding to a viscosity of 25 degrees Centigrade of 0.5 to 50,000 centipoise and preferably of 1 to 10,000 centipoise.

The concentration of ingredient C should be from 0.1 to 10 weight parts per 100 weight parts of ingredient A.

The Microencapsulated Platinum Catalyst (Ingredient D)

Ingredient D consists of spherical microparticles of a silicone resin containing at least 0.1 weight %, based on platinum metal, of an encapsulate platinum-containing hydrosilation catalyst. Suitable catalysts include but are not limited to platinum metal, platinum compounds and compositions based on these compounds that have been shown to catalyze hydrosilylation reactions.

Specific examples of suitable hydrosilation catalyst are platinum micropowder, chloroplatinic acid, alcohol-modified chloroplatinic acid, platinum/diketone complexes, olefin/chloroplatinic acid complexes, alkenylsiloxane/chloroplatinic acid complexes, and any of these catalysts supported on carriers such as alumina, silica, and carbon black.

Complexes of chloroplatinic acid and alkenylsiloxanes are preferred, based on their high catalytic activity as curing catalysts for the present compositions, the platinum/alkenylsiloxane complexes disclosed in Japanese Patent Publication Number 42-22924 [22,924/67] being particularly preferred.

The silicone resin used to encapsulate the hydrosilation catalyst must have a softening point in the range of from 50 to 200 degrees Centigrade. When this softening point is less than 50 degrees Centigrade, there is a drastic decline in storage stability following addition of this ingredient to the curable organosiloxane composition. When the softening point exceeds 200 degrees Centigrade, the temperature at which catalytic activity appears becomes so high that it does not develop under conventional processing conditions.

To achieve optimum curing characteristics the softening point of the silicone resin is preferably from 70 to 150 degrees Centigrade.

While there are no specific limitations on the molecular structure and chemical structure of the silicone resin used to encapsulate the hydrosilation catalysts, it is essential that the resin be impermeable to the catalyst and that it not dissolve in the organosiloxane ingredients of the curable composition.

Suitable silicone resins include but are not limited to resins with the average unit formula

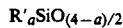

where R' represents a combination of methyl and phenyl radicals and the value of a is from 0.8 to 1.8.

Ingredient D is a spherical microparticulate material consisting essentially of the platinum-containing hydrosilation catalyst encapsulated within particles of the aforementioned silicone resin. The concentration of catalyst within the microparticle is preferably equivalent to from 0.01 to 5 weight percent, calculated on the basis of platinum metal.

The average diameter of the microparticles must be within the range of from 0.01 to 10 micrometers and the particles must have a spherical contour to achieve a satisfactory level of catalytic activity during curing and to maintain a stable dispersion of the microparticles following their incorporation into a curable composition of this invention.

In accordance with a typical procedure for preparing the platinum-containing silicone resin microparticles, the desired platinum catalyst and a silicone resin having a softening point from 50° to 200° C. are dissolved in a suitable solvent. The resultant solution is then sprayed as finely divided droplets into a current of heated gas in order to volatilize the solvent while at the same time solidifying the droplets of solubilized thermoplastic resin into a microparticulate form while the droplets are suspended in the gas stream.

In accordance with an alternative method, a solution is first prepared by dissolving the platinum catalyst and suitable silicone resin in an organic water-immiscible solvent that is compatible with these ingredients. The resultant solution is then emulsified by combining it with an aqueous solution containing a suitable surfactant. The organic solvent is then evaporated from this emulsion to precipitate the platinum-containing silicone resin as spherical microparticles. The particles are then washed with a solvent which will dissolve and remove the platinum catalyst adhering to the surface of the microparticles but will not dissolve or weaken the silicone resin.

The concentration of ingredient D in the curable compositions of this invention is typically equivalent to from 0.001 to 100 parts, preferably from 0.001 to 10 parts by weight of platinum per one million parts of ingredient A.

The Organoperoxide (Ingredient E)

The organoperoxide, referred to as ingredient E of the present compositions, is one of the two catalyst which promote curing of the present organosiloxane compositions. Any of the known organoperoxides can be used as ingredient E. Useful organoperoxides include but are not limited to dicumyl peroxide, di-tert-butyl peroxide, tert-butyl cumyl peroxide, 2,5-dimethyl-2,5-di(tert-butylperoxy)hexane, and 1,1-bis(tert-butylperoxy)-3,3,5-trimethylcyclohexane.

The concentration of organic peroxide is from 0.1 to 10 weight parts per 100 weight parts of ingredient A.

The Acetylenic Alcohol (Ingredient F)

The acetylenic alcohol, referred to as ingredient F, imparts long term storage stability to the present compositions at temperature below the softening point of the silicone resin used to encapsulate the hydrosilation catalyst. The concentration of inhibitor is typically from about 0.1 to about 10 parts by weight per part of resin-encapsulated catalyst. The accompanying examples demonstrate that nitrogen-containing catalyst inhibitors are not satisfactory for use in the present compositions.

The combination of ingredients D, E, and F is the characterizing feature of the present compositions. This combination is responsible for the unique combination of desirable molding properties and long term storage stability exhibited by these compositions.

In the narrowest sense, a curable composition of this invention can contain only ingredients A through F described in the preceding sections of this specification. The compositions can also include additional ingredients that are typically present in curable organosiloxane compositions. These additional ingredients include but are not limited to: crepe-hardening inhibitors such as organosiloxane, organosilazanes, and silanol-terminated polydiorganosiloxanes.

Depending on the end use application of the present compositions, other additives known for use in silicone rubber compositions may be added, for example, inorganic fillers, pigments, thermal stabilizers, and mold-release agents. Specific fillers and pigments include but are not limited to diatomaceous earth, quartz powder, calcium carbonate, mica, aluminum oxide, zinc oxide, magnesium oxide, titanium oxide, carbon black, and red iron oxide. Thermal stabilizers are exemplified by rare-earth oxides, rare-earth hydroxides, cerium silanolate, and the cerium salts of fatty acids. Mold-release agents are exemplified by fatty acids and their metal salts such as stearic acid, zinc stearate, and calcium stearate.

The present curable compositions can be prepared in a simple and straightforward manner by blending ingredients A through F and any other additional ingredients to homogeneity. A particularly preferred method is to first to mix ingredients A and B to homogeneity and then blend in ingredients C, D, E and F together with any additional ingredients.

The curable compositions of this invention exhibit excellent molding properties, including mold release, and are therefore highly qualified for pressure molding applications, for press molding, transfer molding, and injection molding.

EXAMPLES

The following examples and reference examples describe preferred curable compositions and platinum-containing hydrosilation catalysts. The comparative examples serve to compare the molding performance of the present compositions with the performance of prior art compositions that do not contain the combination of an organic peroxide, a silicone resin-encapsulated hydrosilylation catalyst and an acetylenic alcohol.

The exemplified compositions should not be interpreted as limiting the scope of the invention defined in the accompanying claims. Unless otherwise specified all parts and percentages are by weight, viscosities and other properties were measured at 25° C., and physical properties were measured in accordance with the procedures described in Japanese Industrial Standards (JIS) K 6301.

REFERENCE EXAMPLE 1

Preparation of a Platinum/Vinylsiloxane Complex Composition

Six grams of an aqueous chloroplatinic acid solution containing 33 percent platinum and 16 g 1,3-divinyltetramethyldisiloxane were dissolved in 35 g isopropyl alcohol. Ten grams sodium bicarbonate were added to this solution, and the resultant mixture reacted by heating it for 30 minutes at 70° to 80° C. while stirring the suspension. The water and isopropyl alcohol were then evaporated off at 45° C. under a pressure of 50 mm Hg, and the solids were removed by filtration to yield a 1,3-divinyltetramethyldisiloxane solution of a platinum/vinylsiloxane complex catalyst containing 0.6 percent platinum.

REFERENCE EXAMPLE 2

Preparation of Thermoplastic Silicone Resin

A solution was prepared by dissolving 332 g phenyltrichlorosilane, 53 g dimethyldichlorosilane and 110 g diphenyldichlorosilane in 150 g toluene. A cohydrolysis was conducted by dripping this solution into liquid mixture containing 430 g toluene, 142 g methyl ethyl ketone, and 114 g water. The hydrogen chloride generated as a by-product of the hydrolysis was removed by washing the reaction mixture with water. The organic layer of the reaction mixture was then isolated, and the methyl ethyl ketone was removed from this layer by heating. 0.2 Grams potassium hydroxide was then added as a condensation catalyst followed by heating, during which the water formed as a by-product was removed by distillation.

The reaction mixture was then neutralized with acetic acid, followed by repeated washings with water. Removal of the remaining solvent yielded a thermoplastic silicone resin with a glass transition temperature of 65° C. and a softening point of 85° C.

REFERENCE EXAMPLE 3

Preparation of Spherical Platinum-Containing Silicone Resin Microparticles

900 Grams of the thermoplastic silicone resin prepared as described in Reference Example 2, 500 g toluene, and 4,600 g dichloromethane were introduced into a stirrer-equipped glass reactor and blended to form a homogeneous solution. 44.4 g of the platinum/vinylsiloxane complex described in Reference Example 1 were then added with stirring to form a homogeneous solution of the platinum/vinylsiloxane complex and thermoplastic silicone resin. Using a dual flow nozzle and a current of heated nitrogen, this solution was continuously sprayed into a spray dryer chamber obtained from Ashizawa Niro Atomizer K. K. The temperature of the nitrogen was 95° C. at the spray dryer inlet, 45° C. at the spray dryer outlet, and the nitrogen flow rate was 1.3 m³/minute.

After 1 hour of operation of the spray drier, 450 g of a microparticle silicone resin containing the platinum/vinylsiloxane complex catalyst were recovered using a bag filter. This microparticulate catalyst had an average particle diameter of 1.1 micrometers and contained 0.5 weight of particles larger than 5 micrometers. The morphology of this microparticulate catalyst was evaluated by scanning electron microscopy, and it was confirmed that the particles were spherical in contour.

EXAMPLE 1

The following ingredients were introduced into a kneader mixer and blended to homogeneity with heating to prepare a silicone rubber base: 100 parts of an organopolysiloxane gum exhibiting a degree of polymerization of 5,000 and consisting essentially of 99.85 mole % dimethylsiloxane units and 0.15 mole % methylvinylsiloxane units, 7.0 parts of a silanol-terminated dimethylsiloxane exhibiting a viscosity of 60 centistokes, 8 parts of dry-method silica with a specific surface area of 200 m²/g, and 36 parts of wet-method silica with a specific surface area of 130 m²/g.

A curable composition referred to as Example 1 in the following Table 1 was prepared by blending the following ingredients into 100 parts of the rubber base prepared as described in the preceding section of this example:

0.2 parts of a polymethylhydrogensiloxane exhibiting a viscosity of 25 centistokes and the average formula

0.2 parts of 2,5-dimethyl-2,5-di(tert-butylperoxy)hexane, 0.01 parts of the silicone resin microparticle catalyst prepared as described in Reference Example 3, 0.03 parts 1-ethynyl-1-cyclohexanol as a platinum catalyst inhibitor, and 0.1 parts calcium stearate as a mold-release agent.

For comparative purposes, a curable organosiloxane composition outside the scope of the present invention, referred to hereinafter as Comparison Example 1, was prepared as described for the composition referred to as "Example 1", but omitting the microparticulate platinum-containing silicon resin, polymethylhydrogensiloxane and platinum catalyst inhibitor, and increasing the quantity of peroxide to 0.4 parts.

A second comparative composition, referred to hereinafter as Comparison Example 2, was prepared using the same ingredients as "Example 1", with the exception that 0.08 parts of the platinum/vinylsiloxane complex catalyst described in Reference Example 1 and containing 0.6 weight percent platinum was used in place of the spherical microparticulate catalyst-containing silicone resin.

The three curable organosiloxane compositions prepared were injected into molds designed to produce a keypad for use in a desk-top calculator or computer, and their injection molding characteristics were evaluated during this process. The physical properties of these silicone rubber compositions were measured according to Japanese Industrial Standard JIS K 6301. These measurement results are reported in Table 1.

The results of the evaluation demonstrated that the composition of the present invention referred to as "example 1" was completely cured up to the very tip of the flash, and no mold staining developed even after several hundred moldings.

Comparison Example 1 cured incompletely at the tip of the flash. After several tens of moldings, the flash scrap adhered to the mold, the defect rate for the molded article substantially increased, and there was evidence of mold staining.

There was no evidence of mold staining using the composition identified as Comparison Example 2, however, scorching occurred in the area of the screw at temperatures of 60° to 70° C. during injection molding, and the injection pressure gradually rose to a level that impaired long-term operation of the molding process.

TABLE 1

Injection molding conditions and results

| | Example 1 | Comparison Example 1 | Comparison Example 2 |
|---|---|---|---|
| molding conditions | | | |
| vulcanization temperature (°C.) | 190 | 190 | 190 |
| vulcanization time (minutes) | 1 | 1 | 1 |
| injection pressure (kg/cm$^2$) | 120 | 120 | 120 |
| screw temperature (°C.) | 60–70 | 60–70 | 60–70 |
| moldability | | | |
| flash curability | excellent | poor | excellent |
| mold releasability | excellent | poor | excellent |
| mold staining | slight | substantial | slight |
| scorching | no | no | yes |
| use time (see note 1) | 6 months | 6 months | 1 day |
| physical properties of the silicone rubber (see note 2) | | | |
| hardness | 52 | 50 | 52 |
| tensile strength (kg/cm$^2$) | 88 | 86 | 91 |
| elongation (%) | 380 | 420 | 385 |
| tear strength (type A, kg/cm) | 15 | 16 | 15 |

Note 1: Use time. The silicone rubber composition (1 to 3) was allowed to stand at room temperature (25 degrees Centigrade) for a specified period of time, and 200 g of the silicone rubber composition was then milled on a 6-inch roll with a 1 mm gap. It was scored as useable if it was uniformly wrapped on the roll within 1 minute.
Note 2: The value after vulcanization for 10 minutes/170 degrees Centigrade and post-vulcanization for 4 hours/200 degrees Centigrade.

EXAMPLE 2

A curable organosiloxane composition of this invention, referred to hereinafter as example 2 was prepared using the same types and amounts of ingredients as the composition referred to as "example 1", with the exception that 1,1-bis(tert-butylperoxy)-3,3,5-trimethylcyclohexane was used in place of the 2,5-dimethyl-2,5-di(tert-butylperoxy)hexane. This composition was subjected to injection molding testing as described in Example 1 using a vulcanization temperature of 170° C.

The composition referred to as example 2 cured extremely well right up to the tip of the flash, and no mold staining appeared even after several hundred moldings. Table 2 reports these measurement results as well as the physical properties of the cured silicone rubber.

TABLE 2

Injection molding conditions and measurements

| | Example 2 |
|---|---|
| injection molding conditions | |
| vulcanization temperature (degrees Centigrade) | 170 |
| vulcanization time (minutes) | 1 |
| injection pressure (kg/cm$^2$) | 120 |
| screw temperature (degrees Centigrade) | 60–70 |
| injection moldability | |
| flash curability | excellent |
| mold releasability | excellent |
| mold staining | no staining |
| scorching | none |
| use time | 6 months |
| physical properties of the silicone rubber (see note 1) | |
| hardness | 51 |
| tensile strength (kg/cm$^2$) | 93 |
| elongation (%) | 412 |
| tear strength (kg/cm) | 16 |

Note 1: Physical property values: The value measured after curing for 10 minutes at 150° C. and post-curing for 4 hours at 200° C.

EXAMPLE 3

The following ingredients were introduced into a kneader mixer and blended to homogeneity to prepare a base: 65 parts acetylene black and 100 parts of an organopolysiloxane gum exhibiting a degree of polymerization of 500 and consisting essentially of 99.50 mole % dimethylsiloxane units and 0.50 mole % methylvinylsiloxane units. A curable organosiloxane composition of this invention referred to hereinafter as example 3 was then prepared by blending the following ingredients into 100 parts of the base:

2.0 parts of a dimethylsiloxane/methylhydrogensiloxane copolymer exhibiting the average molecular formula

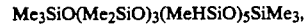

Me$_3$SiO(Me$_2$SiO)$_3$(MeHSiO)$_5$SiMe$_3$, 0.24 parts spherical microparticulate catalyst from Reference Example 3,
0.003 parts 1-ethynyl-1-cyclohexanol, and
2.0 parts 2,5-dimethyl-2,5-di(tert-butylperoxy)hexane.

A curable organosiloxane composition referred to hereinafter as comparison example 3 was prepared using the same types and amounts of ingredients as the composition referred to as "example 3" but omitting the spherical microparticulate catalyst, dimethylsiloxane/methylhydrogensiloxane copolymer, and platinum catalyst inhibitor.

These compositions were pressure molded as described in Example 1 into keypads for desk top electronic equipment. The composition referred to as "Example 3" in Table 3 was completely cured, even including the flash that overflowed from the mold, and the mold release was also quite good. By contrast the flash from the composition identified as "Comparison Example 3" in Table 3 was uncured, and the mold release of the cured key pad was extremely poor. The results of the various property measurements are reported in Table 3.

TABLE 3

Pressure molding conditions and measurement results

|  | Example 3 | Comparison Example 3 |
|---|---|---|
| molding conditions |  |  |
| vulcanization temperature (°C.) (degrees Centigrade) | 170 | 170 |
| vulcanization time (minutes) | 10 | 10 |
| pressure (gauge, kg/cm$^2$) | 150 | 150 |
| moldability |  |  |
| flash curability | excellent | poor |
| mold release | excellent | poor |
| mold staining | slight | substantial |
| use time | 3 months | 6 months |
| physical properties of the silicone rubber (see note 1) |  |  |
| hardness | 75 | 77 |
| tensile strength (kg/cm$^2$) | 70 | 62 |
| elongation (%) | 120 | 150 |
| tear strength (kg/cm) | 12 | 13 |
| volume resistivity (ohm-cm) | 2.0 | 2.3 |

Note 1: Physical property values for the sheet: The values were measured following curing for 10 minutes at 170° C. and post curing for 4 hours at 200° C.

EXAMPLE 4

This example and comparative example 5 demonstrate the adverse effect of phenyl hydrazine, a catalyst inhibitor taught in the aforementioned U.S. Pat. No. 3,992,355 to Itoh et al., on the mold release properties of the composition and the service life of the mold.

100 parts of a dimethylvinylsiloxy-terminated polydimethylsiloxane gum, 22 parts of dry method silica exhibiting a specific surface area of 200 m$^2$/g., 2 parts of diphenylsilane diol and 2.2 parts of a silanol-terminated polydimethylsiloxane exhibiting a viscosity of 0.02 Pa.s were placed in a kneader type mixer and mixed to homogeneity at a temperature of 160 degrees C. to yield silicone rubber base 1.

100 parts of silicone base 1 were blended using a two roll mill with 50 parts of quartz flour with an average particle size of 5 microns, 5 parts of red iron oxide and 0.4 part of a methylhydrogensiloxane exhibiting the molecular formula (CH$_3$)$_3$SiO(CH$_3$HSiO)$_{40}$Si(CH$_3$)$_3$ to yield silicone base 2.

A curable composition of the present invention was prepared by blending 100 parts of silicone base 2 with 0.01 part of the microparticulate platinum catalyst described in Reference Example 3, 0.03 part of 1-ethynyl-1- cyclohexanol as the platinum catalyst inhibitor and 0.25 part of 2,5-dimethyl-2,5-di(tert-butylperoxy)hexane.

COMPARATIVE EXAMPLE 5

For comparative purposes, a composition outside the scope of the present invention was prepared by blending 100 parts of silicone base 2 with 0.1 part of a 2 weight percent solution of chloroplatinic acid in 2-ethylhexanol in place of the microparticulate platinum catalyst, 0.15 part of phenyl hydrazine in place of 1-ethynyl-1-cyclohexanol as the platinum catalyst inhibitor and 0.15 part of a 1:1 weight ratio mixture of benzoyl peroxide and a liquid polyorganosiloxane.

The compositions of example 4 and comparative example 5 were injected into molds for producing key-pads for use in desk-top calculators and computers. The injection molding characteristics of the compositions were evaluated and the physical properties of the cured compositions were measured in accordance with the procedures of Japanese Industrial Standard (JIS) K 6301.

The results of these evaluations are summarized in Table 4.

TABLE 4

Injection Molding Conditions and Results

|  | Example 4 | Comparative Ex. 5 |
|---|---|---|
| Molding Conditions |  |  |
| Curing Temperture (°C.) | 190 | 190 |
| Curing Time (minutes) | 1 | 1 |
| Injection Pressure (kg/cm$^2$) | 120 | 120 |
| Screw Temperature (°C.) | 60–70 | 60–70 |
| Moldability |  |  |
| Flash Curability | Excellent | Excellent |
| Mold Releasability | Fair | Poor |
| Mold Staining | Slight | Substantial |
| Scorching | No | Yes |
| Use Time At 40° C.* | 2 Months | 2 Days |
| Physical Properties** |  |  |
| Hardness | 47 | 48 |
| Tensile Strength (kg/cm$^2$) | 70 | 68 |
| Elongation (%) | 420 | 440 |

*See note 1 of Table 1. Compositions were stored at 40° C. rather than 25° C.
**See note 1 of Table 2.

The data in Table 4 demonstrate that the composition of the present invention (Example 4) was completely cured up to the very tip of the flash. The composition of comparative example 5 containing the non-encapsulated platinum catalyst and the hydrazine catalyst inhibitor of the Itoh et al. patent cured to the tip of the flash, however the molded article adhered to the mold, there was evidence of mold staining, and scorching occurred in the area of the mold. During the injection molding step the injection pressure gradually rose to a level that impaired long-term operation of the molding process.

EXAMPLE 6

This example and comparative example 7 demonstrate the reduction in mold staining achieved using an encapsulated platinum catalyst.

100 parts of a dimethylvinylsiloxy-terminated polydimethylsiloxane containing an average of 620 dimethylsiloxane units per molecule and exhibiting a viscosity of 20 Pa.s were blended in a kneader mixer with 6 parts of hexamethyldisilazane followed by 3 parts of water, at which time 35 parts of dry method silica with a specific surface area of 200 m$^2$/g are added to the mixture. The mixture was blended for 2 hours at 150° C. in the presence of nitrogen. After the mixture had cooled to 50° C. 0.25 part of dicumyl peroxide were blended with 100 parts of the mixture. After cooling to room temperature the mixture is homogenized using a three roll mill. The resultant mixture was then blended with 0.01 part of the spherical microparticulate catalyst described in Reference Example 3 of this specification and 0.03 part of 1-ethynyl-1-cyclohexanol in a vessel with stirring. A curable composition of this invention was prepared by blending this mixture with 1.0 part of an organosiloxane copolymer of the average formula Me$_2$HSiO(MeHSiO)$_m$(Me$_2$SiO)$_n$HMe$_2$ where the ratio of m to n is 2 and the polymer exhibits a viscosity of 75 Pa.s.

COMPARATIVE EXAMPLE 7

A curable organosiloxane composition outside the scope of the present invention was prepared by replacing the spherical microparticulate catalyst of example 6 with 0.2 part of the platinum-vinylsiloxane-diluent mixture described in reference example 1 of the present specification, using 0.07 part of 1-ethynyl-1-cyclohexanol catalyst inhibitor instead of 0.03 part, and 2.5 part of dicumyl peroxide instead of 0.25 part.

The curable compositions described in example 6 and comparative example 7 were molded and evaluated as described in comparison example 5 of this specification and the results are recorded in Table 5.

TABLE 5

| Injection Molding Conditions and Results | | |
| --- | --- | --- |
|  | Example 6 | Comparative Ex. 7 |
| Molding Conditions | | |
| Curing Temperature (°C.) | 160 | 160 |
| Curing Time (minutes) | 1 | 1 |
| Injection Pressure (kg/cm$^2$) | 25 | 25 |
| Screw Temperature (°C.) | 10 | 10 |
| Moldability | | |
| Flash Curability | Excellent | Excellent |
| Mold Releasability | Excellent | Excellent |
| Mold Staining | Slight | Substantial |
| Scorching | No | No |
| Use Time At Room Temperature* | 6 Months | 3 Days |
| Physical Properties** | | |
| Hardness | 37 | 35 |
| Tensile Strength (kg/cm$^2$) | 76 | 73 |
| Elongation (%) | 420 | 440 |
| Tear Strength (Type A, kg/cm) | 18 | 19 |

*See note 1 of Table 1. Compositions were stored at Room Temperature rather than 25° C.
**See note 1 of Table 2.

That which is claimed is:

1. A curable organosiloxane composition comprising
(A) 100 weight parts of a polyorganosiloxane gum containing at least 2 silicon-bonded alkenyl radicals in each molecule and represented by the average unit formula $$R_aSiO_{(4-a)/2}$$

where R is a monovalent hydrocarbon or halogenated hydrocarbon radical, and the value of a is from 1.8 to 2.3, inclusive,
(B) from 10 to 100 weight parts of a reinforcing filler,
(C) from 0.1 to 10 weight parts of an organohydrogensiloxane containing at least 2 silicon-bonded hydrogen atoms in each molecule,
(D) an amount of a microencapsulated platinum-containing hydrosilation catalyst sufficient to promote curing of said composition, where said catalyst is encapsulated within spherical microparticles of a thermoplastic silicone resin having a softening point of from 50° to 200° C., where said microparticles exhibit a diameter of from 0.01 to 10 microns and contain a concentration of said catalyst equivalent to at least 0.01 weight percent, calculated on the basis of platinum metal,
(E) from 0.1 to 10 weight parts of an organic peroxide, and
(F) an amount of an acetylenic alcohol sufficient to provide long-term storage stability to the curable composition at temperatures below the softening temperature of the resin used to encapsulate the hydrosilation catalyst.

2. A composition according to claim 1, where each R is individually selected from the group consisting of alkyl, alkenyl, and fluorinated alkyl radicals, the viscosity of said organopolysiloxane is at least 10$^7$ centistokes, and the molecular weight of said organopolysiloxane is at least 40×10$^4$,
said reinforcing filler is a microparticulate silica or carbon black,
the viscosity of said organohydrogenpolysiloxane is from 0.5 to 50,000 centipoise and the concentration of said organohydrogenpolysiloxane in said composition is from 0.1 to 10 parts by weight per 100 parts of said organopolysiloxane,
said peroxide is selected from the group consisting of dicumyl peroxide, di-tert-butyl peroxide, tert-butyl cumyl peroxide, 2,5-dimethyl-2,5-di(tert-butylperoxy)hexane, and 1,1-bis(tert-butylperoxy)3,3,5-trimethylcyclohexane,
said platinum-containing hydrosilylation catalyst is an alkenylsiloxane/chloroplatinic acid complex,
the softening point of said silicone resin is from 70° to 150° C. and the average unit formula of said resin is $$R'_aSiO_{(4-a)/2}$$

where R' represents a combination of methyl and phenyl radicals and the value of a is from 0.8 to 1.8,
said microparticles contain from 0.01 to 5 weight percent of said catalyst, calculated as platinum metal, and the concentration of said catalyst in said composition is equivalent to 0.001 to 100 parts of platinum metal per million parts of said organopolysiloxane.

3. A composition according to claim 2 where
the particles of said microparticulate silica do not exceed 50 nanometers in diameter and the surface area of said particles is at least 100 m$^2$/g,
the viscosity of said organohydrogenpolysiloxane is from 1 to 10,000 centipoise,
the concentration of said catalyst is equivalent to from 0.001 to 10 parts of platinum metal per million parts of said organopolysiloxane, and
each R is selected from the group consisting of methyl and vinyl.

4. A composition according to claim 1 where said composition exhibits reduced scorching and staining during molding.

* * * * *